(12) United States Patent
Dehmlow

(10) Patent No.: US 6,513,937 B1
(45) Date of Patent: Feb. 4, 2003

(54) APPARATUS AND METHOD FOR INTEGRATING LIGHT FROM MULTIPLE LIGHT SOURCES

(75) Inventor: Brian P. Dehmlow, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 156 days.

(21) Appl. No.: 09/665,746

(22) Filed: Sep. 19, 2000

(51) Int. Cl.[7] ............... G03B 21/26; G03B 21/00; G03B 21/28; G02B 6/04; G09B 19/16
(52) U.S. Cl. ............... 353/94; 353/12; 353/13; 353/14; 353/37; 353/99; 353/122; 385/115; 385/116; 385/119; 385/133; 434/44
(58) Field of Search ............... 349/11; 353/12, 353/13, 14, 94, 37, 98, 99, 122; 385/115, 116, 119, 133, 901; 434/44

(56) References Cited

U.S. PATENT DOCUMENTS 5,661,837 A * 8/1997 Yamamoto et al. ......... 385/115
5,765,934 A * 6/1998 Okamori et al. ............. 353/94
6,309,072 B1 * 10/2001 Deter ........................ 353/31
6,362,797 B1 * 3/2002 Dehmlow .................. 345/32

OTHER PUBLICATIONS

Co–pending patent application Docket No. 00CR017/KE entitled "Apparatus And Method For Using Orthogonally Polarized Light In Projection Cockpit Displays" filed on an even date, inventor B. Dehmlow.

* cited by examiner

Primary Examiner—Russell Adams
Assistant Examiner—Melissa J. Koval
(74) Attorney, Agent, or Firm—Nathan O. Jensen; Kyle Eppele

(57) ABSTRACT

An apparatus and method for illuminating a projection display which includes multiple light sources which are integrated through a multi-input ported light pipe disposed between the multiple lamps and the remainder of the projection display.

20 Claims, 3 Drawing Sheets

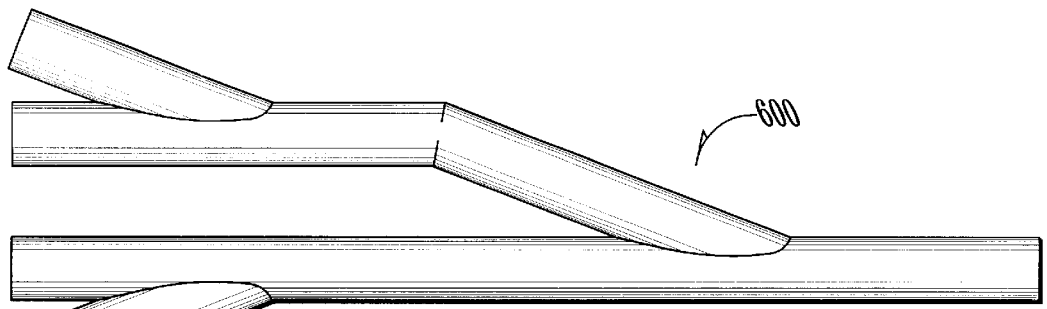
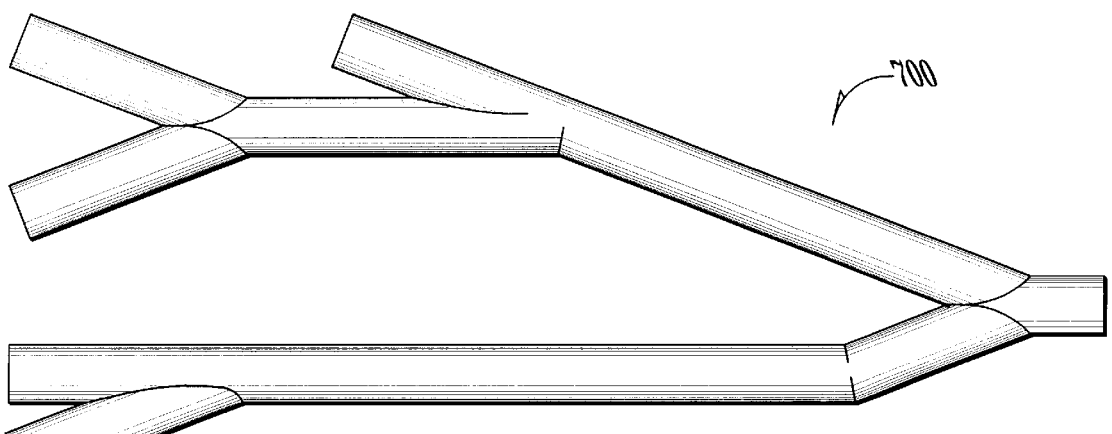

APPARATUS AND METHOD FOR INTEGRATING LIGHT FROM MULTIPLE LIGHT SOURCES

CROSS REFERENCE TO RELATED APPLICATION

This application relates to co-pending application entitled "APPARATUS AND METHOD FOR USING ORTHOGONALLY POLARIZED LIGHT IN PROJECTION COCKPIT DISPLAYS" filed on even date herewith by the same inventor and assigned to a common assignee.

FIELD OF THE INVENTION

The present invention generally relates to projection cockpit displays, and even more particularly relates to such displays having multiple sources of illumination.

BACKGROUND OF THE INVENTION

In the past, designers of avionics displays have endeavored to provide projection displays with ever-increasing image quality, reliability, and economic efficiency. Projection displays generally use a single, broad-spectrum white light source to illuminate an image generating system. These lamps are often high-intensity, high-efficiency incandescent or discharge-type lamps that have lifetimes of less than 5000 hours. Reliance on such single short-lifetime lamps makes projection displays difficult to deploy in an avionics environment in an economically efficient manner. Other lamps with longer lifetimes have been used, but they often generate a white light, which has a deficiency at one or more wavelengths in the needed spectrum. To address these deficiencies, lamps with increased overall output may be used, so that the areas of relative deficiency exceed the minimum threshold. However, in such cases, other wavelengths output too much light, which then requires color filters to be employed to attenuate certain wavelengths. This attenuation results in inefficiencies because more light than is needed is generated and then discarded. This results in undesirable amounts of heat being generated and power being consumed.

Consequently, there exists a need for improvement in illumination of projection displays.

SUMMARY OF THE INVENTION

It is an object of the present invention to provide projection displays having a superior image luminance characteristic.

It is a feature of the present invention to utilize multiple light sources for a single projection display area.

It is an advantage of the present invention to provide increased optical output power than is feasible with single sources.

It is another feature of the present invention to utilize multiple light sources which may use differing technologies or designs.

It is another advantage of the present invention to utilize different light source technologies under different display operating conditions.

It is another feature of the present invention to utilize a light flux integrator.

It is another advantage of the present invention to optically combine light from multiple light sources into a single output.

It is another advantage of the present invention to have high efficiency of light coupling between sources and displays.

It is another advantage of the present invention to have a rugged light collection and integration system.

It is another object of the present invention to provide projection displays having a superior image spectral characteristic.

It is another feature of the present invention to include a plurality of light sources which may have spectrally complementary characteristics.

It is another advantage of the present invention to reduce unevenness in power distribution across the spectral range.

It is another advantage of the present invention to provide different source spectra during different modes of display operation.

It is another object of the present invention to provide projection displays having a superior lamp replacement or maintenance characteristic.

It is another feature of the present invention to include redundant light sources used in a simultaneous manner.

It is another advantage of the present invention to provide a fail operational projection display wherein the display remains useful after failure of one or more sources.

It is another feature of the present invention to use multiple light sources in a sequential manner.

It is another advantage of the present invention to provide for extended service life of an avionics projection display lamp system.

It is another feature of the present invention to use multiple light sources in a complex combination of sequential and simultaneous operation.

It is another advantage of the present invention to provide for an extended image luminance dimming range.

The present invention is an apparatus and method for illuminating projection displays, which are designed to satisfy the aforementioned needs, provide the previously stated objects, include the above-listed features, and achieve the already articulated advantages. The present invention reduces maintenance time wasted in repeatedly changing short lifetime lamps. Similarly, the amount of excess light and heat that is generated when color filters are used to affect spectral deficiencies is also reduced.

Accordingly, the present invention is a projection display system which utilizes a multi-lamp architecture where light from these multiple lamps is integrated to illuminate one projection display system.

BRIEF DESCRIPTION OF THE DRAWINGS

The invention may be more fully understood by reading the following description of the preferred embodiments of the invention, in conjunction with the appended drawings wherein:

FIG. 6 is a simplified block diagram of a system of the present invention, including an asymmetrical cascade of inputs.

FIG. 7 is a simplified block diagram of a system of the present invention, including a mixed cascade of symmetrical and asymmetrical inputs.

DETAILED DESCRIPTION

Figure 1:
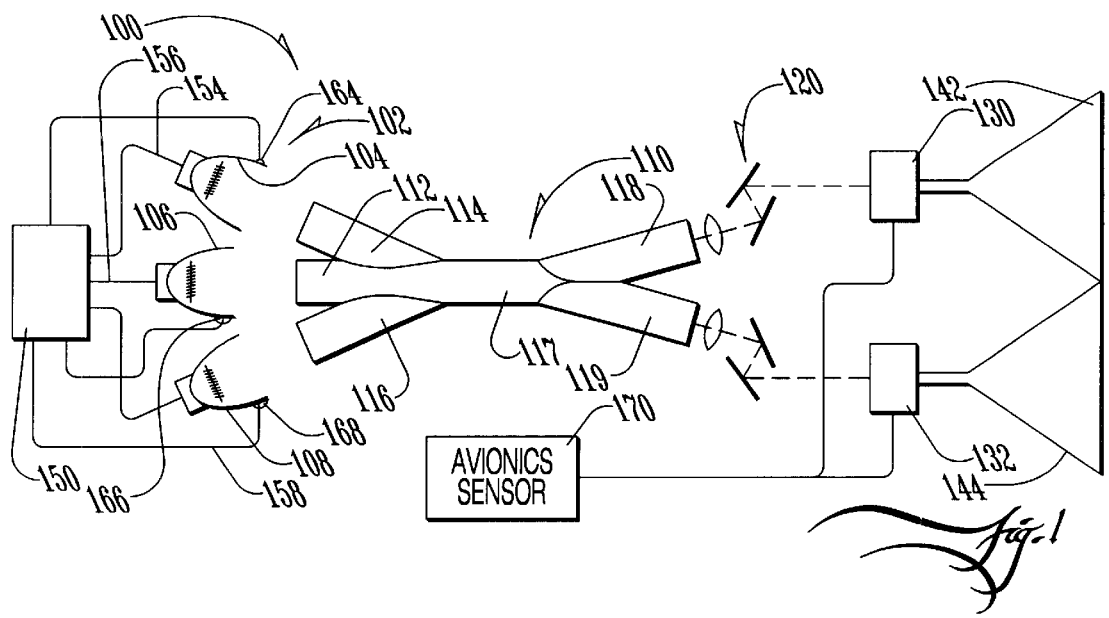
FIG. 1 is a simplified block diagram of a tiled projection display system of the present invention, including a flux integrator.

Now referring to the drawings wherein like numerals refer to like matter throughout, there is shown a system of the present invention, generally designated 100, having a tiled projection display system 100, having a lamp array 102, which includes: first lamp 104, second lamp 106, third lamp 108, which can be any type of lamp. However, in one preferred embodiment, these three lamps are preferably complementary in their spectral performance. The term "complementary" is used herein to suggest that a combination of emissions of two or more light sources tends to provide a more desirable spectral emission pattern across the visible spectrum; i.e., one lamp may have a peak in power at a wavelength where the other lamp has a reduced power level. In another embodiment, the output characteristics of these three lamps are identical, and a fail operational configuration can be achieved. First lamp 104, second lamp 106, and third lamp 108 are optically coupled to flux integrator 110 via first input port 112, second input port 114, and third input port 116, respectively. Flux integrator 110 includes an integrator throat 117 centrally disposed with first output port 118 and second output port 119 opposing the input ports 112, 114, and 116. The details of flux integrator 110 are given below in reference to FIG. 2. Also shown in FIG. 1 are separation optics 120 and projection display modulation device 130, and projection display modulation device 132, which produce images to be viewed on first display tile 142 and second display tile 144, respectively. Projection display modulation device 132 and projection display modulation device 130 could be any type of electro-optical device where it is a transmissive or reflective display. However, an LCD display is often preferred, but in certain small-sized applications, digital micro-mirror devices are believed to be preferable. Separation optics 120 could be any type of optics, including reflective optics, refractive optics, fiber optics, a combination of the three, or other optical apparatus which delivers the light emanating from first output port 118, and second output port 119 to the projection display modulation device 130 and projection display modulation device 132. Projection display system 100 is shown in FIG. 1 as being a tiled projection display, but this is not a requirement. The present invention will work with single channel, non-tiled displays as well.

The term "tiled display" is used herein to refer to a display system where two or more distinct display surfaces are located immediately adjacent to each other, and each display surface is controlled by its own display modulation device (e.g. LCD, micro-mirror wafer, etc.). However, each display surface is caused to display a segment of a larger image, such that a viewer sees one continuous image across the two distinct display surfaces.

The tiled display shown makes one of the advantages of the present invention readily apparent. The reliability advantages of the present invention include the ability to continue to operate two displays, albeit with lesser performance, in the event of a failure of as many as two lamps. In the aviation environment where it is extremely difficult to change the lamps in a projection display, and where it is extremely important to have a functional display at all times, the reliability advantages of the present invention are quite significant.

Where image chromaticity issues are of a primary concern, then first lamp 104, second lamp 106, and third lamp 108 could all be spectrally complementary lamps; i.e., one could emit more red light, while the other emits more green, and the last produces more blue. This approach allows the individual color primaries, as well as the integrated white, to be spectrally optimized.

Where reliability and redundancy issues are of primary concern, then first lamp 104, second lamp 106, and third lamp 108 may each be a broad spectrum white light.

Where spectral emission restriction issues are of primary concern, then first lamp 104, second lamp 106, and third lamp 108 may each have output limited to certain wavelength ranges to be employed during different modes of display operation. For instance, one lamp may be fitted with infrared absorbing filters needed to make the display night-vision-goggle compatible.

When increased image luminance of the projection display system 100 is a primary concern, then first lamp 104, second lamp 106, and third lamp 108 could be operated simultaneously.

When varying image luminance of the projection display system 100 is a primary concern, then first lamp 104, second lamp 106, and third lamp 108 could be operated in a complex combination of simultaneous and sequential operation to provide a wide range of dimming.

When operating environment of the projection display system 100 is a primary concern, then first lamp 104, second lamp 106, and third lamp 108 could be differing lamp technologies that perform acceptably under vastly different conditions of temperature, humidity, vibration, or other external conditions.

When extended service life of the projection display system 100 is a primary concern, then first lamp 104, second lamp 106, and third lamp 108 could be operated sequentially. Each lamp 104, 106, and 108 could be driven by a simple switching/failure detecting device 150, together with drive lines 154, 156, and 158, respectively, which would switch the operation of the lamps in the event of a failure of one of the other lamps. Device 150 could be automated with light detectors (photo diodes) 164, 166, and 168, such that second lamp 106 and third lamp 108 would be disabled if light could be detected by light detector 164 as coming from first lamp 104. Well-known systems of automatically detecting and sequencing the operation of lamps 104, 106, and 108 could be employed such that one and only one lamp is illuminated at all times. Projection display modulation device 130 and projection display modulation device 132 could be coupled to an avionics sensor 170, disposed on an aircraft, which generates signals representative of operational characteristics of said aircraft, such as attitude of the aircraft, location, and situational awareness information for use by a pilot of the aircraft. Avionics sensor 170 may include display signal generation circuitry which is well known in the art. In a preferred embodiment, the avionics sensor 170 would provide the signal representative of an operational characteristic of the aircraft to a multi-purpose display generation system, which is well known in the art for accepting various operational information and converting it to signals more readily receivable and usable by a projection display modulation device 130.

Figure 2:
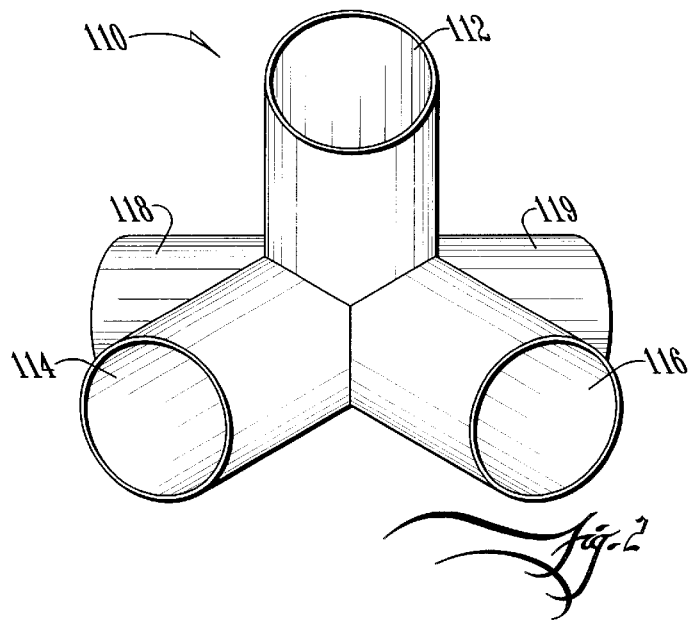
FIG. 2 is a perspective view of the flux integrator of FIG. 1.

Now referring to FIG. 2, there is shown a flux integrator 110, of FIG. 1. Flux integrator 110 is shown as having circular shaped ports. It should be understood that any shape of port could be used, such as square, rectangular, or a shape which is generally matched to the shape of the first display tile 142 or other display surface or intermediate component. It is believed that in many applications, a rectangular shaped port may be preferred. Flux integrator 110 is preferably a light pipe and is preferably not operating as a waveguide. As such, the dimensions of flux integrator 110 are extremely larger than the wavelengths of light transmitted therethrough. Each length or width dimension of flux integrator 110 is longer than many wavelengths of light. Flux integrator 110 is preferably made of well-known materials in a well-known manner, such as glass, plastic, or transparent ceramics. Preferably, flux integrator 110 is not an optical fiber and does not have a central core with cladding disposed around it.

Figure 3:
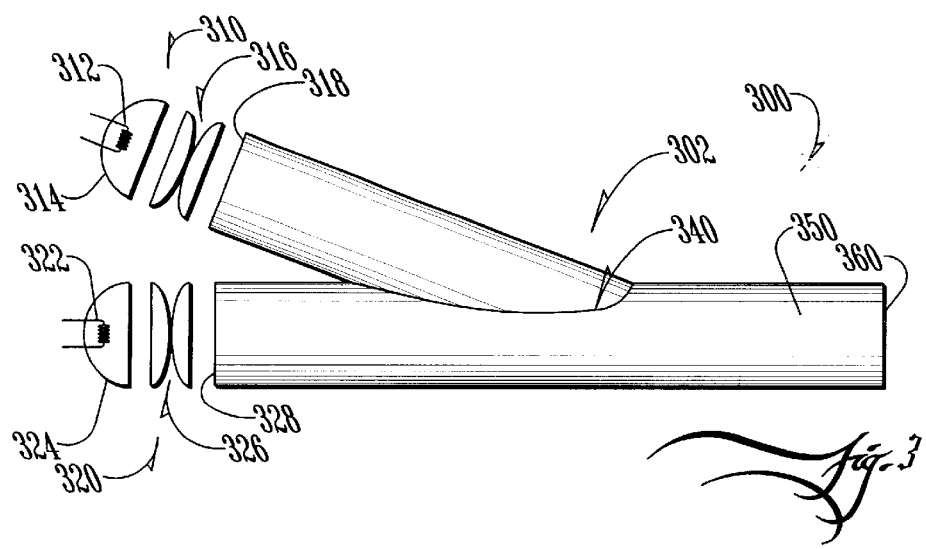
FIG. 3 is a simplified block diagram of a system of the present invention, including two input light sources and an asymmetrical flux integrator.

A more thorough understanding of the present invention can be obtained by now referring to FIG. 3, which shows a flux integrator display system 300, which includes: a flux integrator generally designated 302, a first light source 310, and a second light source 320.

First light source 310 includes a first light-producing element 312, which could be any type of lamp, such as an arc lamp, and more specifically a Na vapor, Hg vapor, metal halide or Xenon lamp. A first light-reflecting element 314 is disposed around first light producing element 312 and is well known in the art. First light directing optics 316 are also well known in the art and are used for optically coupling the light from first light producing element 312 into the first light input port 318. First light producing element 312 may be a circular bulb, while first light input port 318 has a rectangular shape. Due to the extremely long length, in comparison to the wavelengths of visible light, of flux integrator 302, a circular light pattern can be directly launched into the flux integrator 302, and despite a rectangular shape, at light output port 360, the light exiting flux integrator 302 is generally conforming to a rectangular pattern. Flux integrator display system 300 includes second light source 320 which has components: second light producing element 322, second light reflecting element 324, and second light directing optics 326, which are similar to first light producing element 312, first light reflecting element 314, and first light directing optics 316, respectively. Second light source 320 provides light through second light input port 328 into the light integration region 340 of flux integrator 302. Flux integrator 302 includes a light integrator throat 350, the length of which will vary from application to application depending upon the numerous other variables. Flux integrator 302 includes a light output port 360, which provides light to the remainder of the display system with its display modulation device and display surface. The dimensions of the flux integrator 302 can vary, depending upon the circumstances, but it is believed that the dimensions of light output port 360 would likely be preferably between one-fourth to one inch, on edge for rectangular shapes and diameter for circular shapes.

Numerous varieties of the flux integrator of the present invention are envisioned. Now referring to FIG. 4, there is shown a symmetrical flux integrator 400, having a first symmetrical light input port 418, a second symmetrical light input port 428, a symmetrical light integration region 440, a symmetrical light integrator throat 450, and a symmetrical light output port 460.

Figure 4:
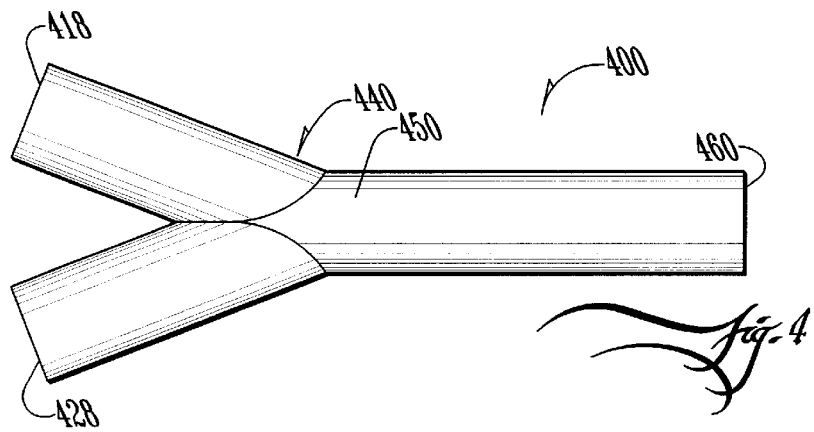
FIG. 4 is a simplified block diagram of a system of the present invention, including a symmetrical flux integrator.
Figure 5:
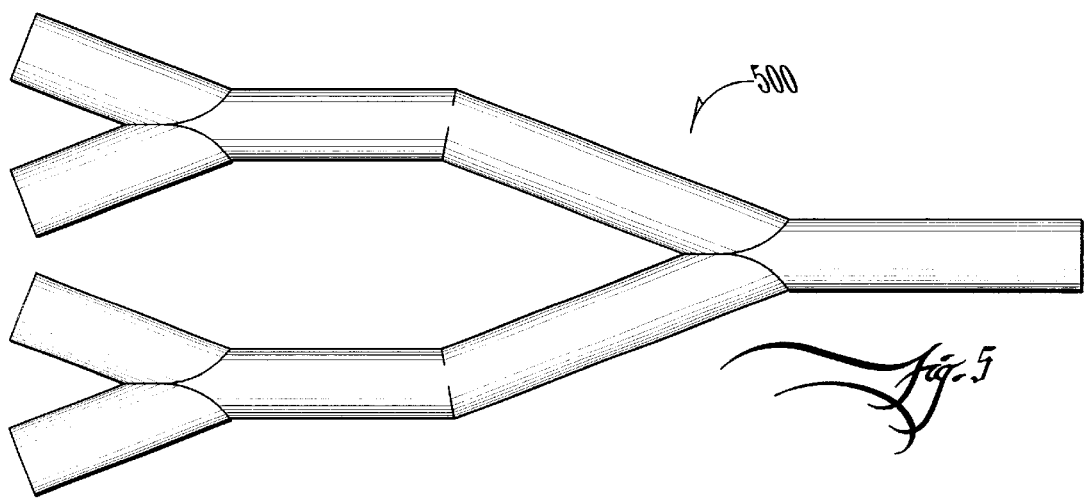
FIG. 5 is a simplified block diagram of a system of the present invention, including a symmetrical cascade of inputs.

Now referring to FIGS. 5–7, there are shown several possible combinations of the flux integrator 302 (FIG. 3) and symmetrical flux integrator 400 (FIG. 4). Numerous varieties are possible, including symmetric cascade 500, asymmetric cascade 600, and mixed cascade 700. In operation, the apparatus and method of the present invention could function as follows: Light is launched from a group of lamps into a group of input ports of a multi-input port light pipe, where there is a one-to-one correspondence between lamps and input ports. The light is integrated into a light integration region and then transmitted along a light integrator throat 350 and out a light output port 360, where it is incident upon the remainder of the projection system which includes the separation optics 120, the projection display modulation device 130, and ultimately the display surface.

While the above description refers to avionics projection displays and to LCDs and micro-mirror devices, this is done because it is believed that the benefits of the present invention will be readily apparent in such cases. It is not the intention of the present invention to be limited to avionics projection displays and LCD and micro-mirror devices, but it should extend to any type of display where the advantage of the present invention can be utilized.

It is thought that the method and apparatus of the present invention will be understood from the foregoing description and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. An apparatus for projecting an image in an aircraft cockpit comprising:
    a plurality of lamps for generating light;
    a flux integrator having a plurality of input ports optically coupled to the plurality of lamps for receiving and integrating light generated by said plurality of lamps and providing an integrated light output at an output port said flux integrator being dimensionally adapted and configured with dimensions longer than wavelengths of visible light;
    separation optics optically coupled to the flux integrator for receiving the integrated light output and delivering a light output;
    a projection display modulation device that is optically coupled to said separation optics for receiving the light output and electrically coupled to and responsive to signals from sensors on an aircraft, said projection display modulation device generates an image having a predetermined modulating device image size;
    a display surface having a display surface image viewing area thereon; and,
    a viewable image is caused to be formed on said display surface in response to the light that is generated by said plurality of lamps, modulated by said projection display modulation device.

2. An apparatus of claim 1 wherein said flux integrator is a light pipe further comprising:
    a first input port optically coupled to a first lamp for receiving light;
    a second input port optically coupled to a second lamp for receiving light; and
    an integrator throat centrally disposed with the output port and the first and second input ports to integrate the light and provide the integrated light output.

3. An apparatus of claim 2 wherein said light pipe output port is adapted and configured for illuminating said projection display modulation device.

4. An apparatus of claim 3 wherein said light pipe has a plurality of output ports wherein a count of said output ports is lower than a count of said plurality of input ports.

5. An apparatus of claim 4 wherein said plurality of lamps each simultaneously emits light.

6. An apparatus of claim 5 wherein each of said plurality of lamps has a different spectral emission characteristic.

7. An apparatus of claim 6 wherein each of said plurality of lamps has a spectral emission characteristic which is complementary with respect to another of said plurality of lamps.

8. An apparatus of claim 4 wherein only one of said plurality of lamps is emitting light at a time.

9. An apparatus of claim 8 wherein said plurality of lamps is operated sequentially.

10. An apparatus of claim 9 wherein said plurality of lamps is operated sequentially in response to input from a plurality of photo-sensors.

11. An apparatus comprising:

first means for generating a first emission of light on a first emission path;

second means for generating a second emission of light on a second emission path;

means for directing light in said first emission path and said second emission path into an incident emission path;

means for modulating said light in said incident emission path, in response to an input signal from a sensor on an aircraft wherein said sensor produces the signal that relates to an operational characteristic of said aircraft, and thereby generating an image on an image path; and display surface means for receiving an image thereon.

12. An apparatus of claim 11 wherein said means for directing is a flux integrator.

13. An apparatus of claim 11 wherein said means for directing is a multi-input port light pipe.

14. An apparatus of claim 11 wherein said first means for generating and said second means for generating operate sequentially upon an occurrence of a failure of one of said first means for generating or said second means for generating.

15. An apparatus of claim 11 wherein said first means for generating and said second means for generating are discharge lamps having complementary spectral emissions.

16. A method of displaying information comprising the steps of:

generating light along a first path from a first light source at a first location;

generating light along a second path from a second light source at a second location;

directing light from said first source and from said second source along a third path;

modulating light on said third path in response to an input signal from a sensor on an aircraft wherein said sensor produces the signal that relates to an operational characteristic of said aircraft so as to generate an image; and, displaying said image on a viewing surface.

17. A method of claim 16 wherein said first light source is a discharge lamp;

wherein said second light source is a discharge lamp;

wherein said step of directing is accomplished by a light pipe having a plurality of input ports; and wherein said step of modulating light is accomplished by a projection display modulation device.

18. A method of claim 16 wherein each of said lamps operates simultaneously.

19. A method of claim 16 wherein dimming of a displayed image can be achieved via a combination of simultaneous and sequential operation of said lamps.

20. A method of claim 16 wherein said lamps are selected from a group of available lamp technologies where a selection criteria is a characteristic of an operating condition of said apparatus.

* * * * *